July 28, 1942.   E. H. AYERS ET AL   2,291,365
CIRCUIT CONTROLLER
Filed Sept. 17, 1940

Inventor:
Edgar H. Ayers,
Wilbur W. Warner,
by Harry E. Dunham
Their Attorney.

Patented July 28, 1942

2,291,365

UNITED STATES PATENT OFFICE 2,291,365

CIRCUIT CONTROLLER

Edgar H. Ayers, Schenectady, N. Y., and Wilbur W. Warner, Fort Wayne, Ind., assignor to General Electric Company, a corporation of New York Application September 17, 1940, Serial No. 357,126

13 Claims. (Cl. 200—87)

Our invention relates to circuit controllers and more particularly to damping mechanisms for circuit controllers used in connection with high starting torque split-phase alternating current motors.

In starting circuits for split phase motors it is known to use a relay having an operating coil in the running circuit and contacts in the starting circuit of the motor. Such a relay is described and claimed in a copending application of George M. Hausler, Serial No. 204,803, assigned to the same assignee as the present application. When such devices are used with high starting torque motors, especially where the supply frequency is relatively low, difficulty is often encountered because of repeated reclosures of the relay as the starting period draws to a close. As the motor picks up speed and the starting current decreases, the drop out point of the relay is approached. When the relay drops out and excludes the starting windings from the circuit, the overall impedance of the circuit is reduced due to mutual induction of the motor windings and the phase relationships of the currents. Under such conditions there is danger that the relay will again pick up due to the increased motor current passing through its operating coil. Danger of such reclosure is enhanced if the relay armature is still oscillating under the influence of its drop out impulse. If the armature does reclose, it will immediately drop out because of the decrease of motor current caused by the insertion of the starting windings in the circuit.

Accordingly, it is an object of our invention to provide means for restraining oscillation of a relay armature after a single operating impulse has been applied or removed.

It is a further object of our invention to provide, in a relay subject to increased operating force upon drop out, means for damping oscillations of the armature in order to prevent reclosure while the operating force again decreases.

Figure 1:
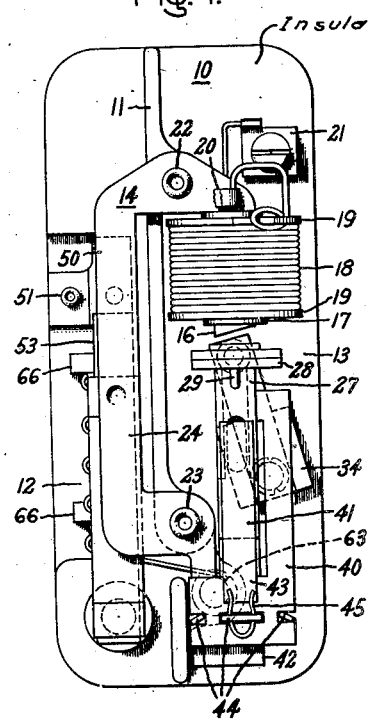
Figure 2:
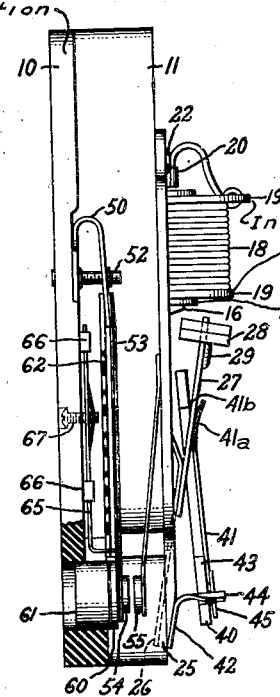
Figure 3:
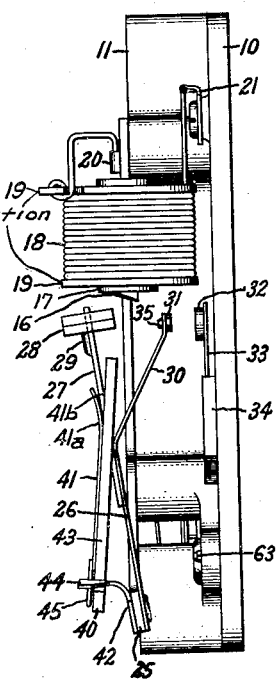
Figures 4, 5:
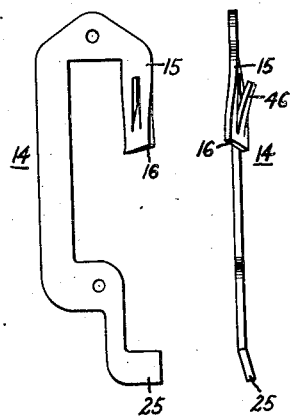
Figure 6:
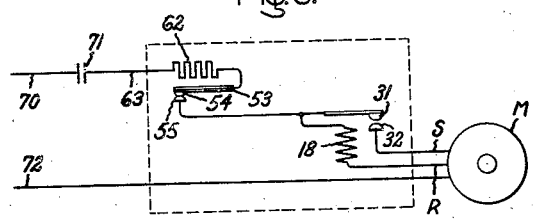

Further objects and advantages of our invention will be apparent and the invention itself will be better understood from the following description taken in conjunction with the accompanying drawing, and the features which we believe to be novel and patentable will be pointed out with particularity in the appended claims. In the drawing, Fig. 1 represents a front elevation of a controller embodying our invention; Fig. 2 is a left side elevational view of Fig. 1, partly in section; Fig. 3 is a right side elevational view of Fig. 1; Figs. 4 and 5 are front and side views respectively of a relay core adapted for use in connection with our invention; and Fig. 6 is a circuit diagram of connections for a controller embodying our invention to a typical refrigeration motor circuit.

Referring now to the drawing, we have shown our invention in one form as applied to a starting and overload controller for a split-phase motor used in connection with a refrigeration system. However, it will be obvious that our invention has broad application to motors requiring special starting means. The controller is mounted on a base 10 of suitable insulating material having a vertically projecting dividing wall 11 running longitudinally of the base 10. The wall 11 serves to segregate a thermally actuable overload responsive device 12 from the major portion of an alternating current starting relay 13 secured to the base 10. The starting relay 13 comprises a magnetizable substantially U-shaped frame 14 curved edgewise and having a core portion 15 provided with a pole face 16. Encircling the core portion 15 and insulated therefrom by a cylindrical insulating jacket 17 is an energizing winding 18, the ends of which are covered by insulating shields 19. The winding 18 is connected between a point 20 on the frame 14 and a terminal 21 secured to the base 10. The frame 14 rests upon and is secured to the upper face of the wall 11 by fastening means such as rivets 22 and 23 and has an intermediate portion 24 overhanging the overload contactor 12.

Former at the other end of the frame 14 is a supporting member 25 to which is secured one end of a cantilever spring 26, the other end of which carries a substantially rigid magnetizable armature 27 secured thereto. As shown, the spring 26 normally supports the armature 27 in spaced relation to the pole face 16 of the magnetizable frame 14 so as to form an air gap between the armature and the frame. Secured to the armature 27 adjacent to the end nearest the air gap, we have provided a short circuited winding 28 comprising a double turn coil of highly conductive material, such as copper, the purpose of which will be more fully described hereinafter. The winding 28 may be conveniently secured to the armature by means of a finger 29 which we have shown pressed from the main body portion of the armature 27.

Extending from the armature 27 is a spring finger 30 which supports at its free end a movable contact 31 in cooperating relation with a relatively fixed contact 32 carried on a supporting arm 33 of a terminal 34 fixed to the base 10. A projection 35 on the backside of the movable contact 31 is arranged to limit movement of the armature 27 toward the pole face 16 by engaging the adjacent side of the short circuited winding 28.

In order to damp vibrations of the armature 27 under the influence of increased energizing current after dropout or under the influence of the spring 26, we provide a friction damping mechanism comprising a yoke 40 carrying a spring finger 41 and pivotally supported upon a bracket 42 mounted upon the supporting member 25 of the frame 14. The spring finger 41 may be fastened to the yoke 40 as by riveting at the point 43. The assembly comprising the yoke 40 and the spring finger 41 is pivotally mounted upon the bracket 42 for rotation about a point spaced from the point of attachment of the spring 26 to the supporting member 25. By way of example, we have shown the bracket 42 provided with three ears 44 cooperating with slots formed in the yoke 40. The yoke 40 fits loosely over the ears 44, and may be held in place by a pin 45. As is shown in Fig. 2, the armature 27 is embraced between the free end of the spring finger 41 and the upper horizontal arm of the yoke 40. The bias of the spring 41 is such that it engages one side of the armature 27 at a point 41a intermediate its ends and holds the upper horizontal arm of the yoke 40 in engagement with the other side of the armature at a point 41b. It will now be apparent that any rotational movement of the armature 27 will result in relative longitudinal movement between the armature 27 and the spring 41 due to the spaced mounting of the armature and the spring. Such relative longitudinal movement produces friction which tends to restrain vibration of the armature.

It will be noted that the point 41a is spaced a short distance along the armature 27 from the point 41b. The spacing of the points of contact results in a rotational force upon the yoke 40 such that the lower horizontal arm of the yoke 40 is biased toward the base 10. This bias of the yoke 40 against the bracket 42 tends to prevent chattering of the yoke upon the bracket, and provides a minimum spring force for a given pressure at the point 41a.

In order to prevent undesirable oscillation of the armature 27 upon pick up of the relay, we have provided the frame 14 with a twisted core portion 15 and a sloped pole face 16. Normally the movement of the armature 27 toward its attracted position stores sufficient momentum in the armature to throw the spring finger 30 and the contact 31 forcibly against the fixed contact 32. Deflection of the spring finger 30 against the fixed contact 32 produces a force tending to move the armature back from its attracted position to its deenergized position. The bias of the cantilever spring 26 also tends to produce such movement in the armature. To prevent such undesirable oscillation we provide a continuously decreasing air gap as the armature approaches its attracted position under the pole face 16. As best shown in Figs. 4 and 5, the plane of the upper part of the core portion 15 is parallel to the base plate 10, while the plane of the lower part of the core portion 15 forms an angle with the base plate 10, preferably an angle of approximately 45 degrees. While the twisted core portion described brings the armature 27 directly under the pole face 16 for a greater portion of its movement than if the plane of the pole face were parallel to the base plate 10, we also provide means for varying the length of the air gap between the pole face 16 and the armature 27 while the armature 27 is directly under the pole face. To this end the pole face 16 is cut to form a small angle with the plane of the insulating washer 19. This is best shown in Figs. 1, 2, and 3. The core portion 15 of the frame 14 may also be provided with means for holding the coil 18 in place. As shown in Figs. 4 and 5, we have provided for this purpose an ear 46 pressed from the core portion 15 and bent to form an angle therewith. With the above construction a continuously increasing magnetic force is applied to the armature 27 as it approaches its picked up position under the pole face 16. The increasing force resulting from the continuously decreasing air gap holds the armature 27 positively in a closed position against the force of the springs 26 and 30, and the tendency of the armature 27 to oscillate is minimized.

In order to dampen oscillations of the armature 27 which might be produced by the alternating character of the electromotive force supplied to the coil 18, we have provided the short circuited windings 28 attached to the upper end of the armature 27. As is well understood in the art, the damping effect of the short circuited winding 28 is due mainly to the out-of-phase flux produced by the circulating current induced in the winding by the changing main flux from the core member 15.

Referring now to the overload responsive device 12, we have provided a U-shaped adjustable supporting member 50 fixed to the base 10 by a rivet or other suitable fastening means 51 and provided with a threaded adjusting screw 52 extending transversely through the legs of the U and adapted to spread or contact the U member 50. Fastened to the upper leg of the member 50 is a bi-metallic strip 53 extending longitudinally of the base 10 and adjustably spaced therefrom by the screw 52. The free end of the bi-metallic strip 53 is arranged to deflect downwardly with a rise in temperature, and carries on its upper face a movable overload contact 54 in normal engagement with a relatively fixed overload contact 55 which is mounted on a resilient strip 56 of conducting material. The resilient strip 56 is attached by brazing, riveting, welding or other suitable means to the overhanging portion 24 of the frame 14 in good electrical connection therewith.

On the lower face of the bi-metallic strip 53 is secured a disk-shaped armature 60 made of magnetic material such as soft iron, and positioned to be attached into engagement with a permanent magnet 61 fixed on the base 10 below the armature 60. The magnet 61 preferably is made of an alloy having a high coercive force and consisting essentially of aluminum, nickel, copper and iron such as is described and claimed in United States Letters Patent 1,947,274, issued February 13, 1934, to William E. Ruder. We prefer to form this magnet material into a button or disk shape having a central groove running diametrically across the upper face thereof and suitably magnetized to have a north pole and a south pole on the upper face and adjacent to the armature 60. We provide means for heating the bi-metallic strip 53 by locating a resistance heater 62 beneath the strip. The heater 62 is spaced from the bi-metallic strip 53 and from the base 10 and has one of its ends in electrical connection with the fixed end of the bi-metallic strip 53 and the other of its ends in electrical connection with a line terminal 63 on the base 10.

In addition to the spacing adjustment 52, an adjustable resilient stop 65 is provided for the bi-metallic strip 53 in order to prevent the armature 60 from being retained by the permanent magnet 61 in an attracted position after the strip 53 has cooled and seeks to return to an undeflected position. The stop 65 consists of a strip of resilient material having an upwardly extending end arranged to press against the bi-metallic strip 53 in its attracted position. The stop 65 is carried on a pair of abutments 66 projecting from the base 10 and is threaded at the middle to receive a screw 67 which may be used to adjust the strip 65 to raise or lower the end which comes in contact with and limits the downward movement of the bi-metallic strip 53.

Referring now particularly to Figs. 1 and 6, the electrical circuits through our controlling relay, when connected to a split-phase motor, may be traced. The supply wire 70 of Fig. 6 is connected to a thermostat 71 which operates in accordance with the temperature of the refrigerator cooling compartment in a manner well known in the art. From the thermostat 71 the circuit continues through the line terminal 63 of the relay and then through the heater 62 and the bi-metallic strip 53 in series to the contacts 54, 55. From the contact 55 the starting circuit of the motor M may be traced through the resilient strip 56, the frame 14, the spring 26, the spring finger 30, the relay contacts 31, 32, the terminal 34, the wire S and the starting winding of the motor back to the supply line 72. A parallel circuit for the running winding of the motor M may be traced from the contact 55 through the magnetic frame 14 to point 20, the coil 18, the terminal 21, the wire R and the running winding of the motor back to the supply line 72.

In the operation of the circuit controller diagrammatically represented in Fig. 6, the thermostat 71 is first actuated to connect the winding 18 to the supply line 70 through the heater 62, the bi-metallic strip 53 and the contacts 54 and 55. A circuit is thus completed through the winding 18 and the running winding of the motor in series. Since at this time the motor is at a standstill, the resistance of its running winding is very low. Therefore, a large surge in current will flow through the winding 18. Such energization of the winding 18 magnetizes the frame 14 sufficiently to attract the armature 27 toward the pole face 16 to close the contacts 31, 32. Engagement of the contacts 31, 32 completes a circuit for the starting winding of the motor M in parallel with the coil 18 and the running winding of the motor M. As the motor M accelerates, the current flowing through its running winding and the relay 18, as well as through the starting winding of the motor, decreases in a manner well understood in the art. When the current flowing through the winding 18 has diminished to a predetermined point, the winding 18 is no longer able to hold the armature 27 in its attracted position. The armature 27 thereupon drops out and opens the starting circuit of the motor M at the contacts 31, 32. In a high starting torque split-phase alternating current motor of the type with which our invention is particularly applicable the mutual induction of the starting and running winding is such that when the starting winding is deenergized the overall impedance of the circuit between the contact 55 and the wire 72 is decreased. As has been previously explained, such a decrease in impedance results in an increase in current through the winding 18 and the consequent danger of reclosure of the contacts 31, 32. According to our invention such reclosure is prevented by the friction damping mechanism 40, 41.

The thermally actuable overload device 12 is so adjusted that for normal running conditions the heat from the heater wire 62 is insufficient to deflect the bi-metallic strip 53 to an extent sufficient for the armature 60 of the strip 53 to be attracted to the permanent magnet 61. Neither does the initial high current which flows in the heater wire 62, when the motor is just starting, cause the strip 53 to be deflected sufficiently to be snapped to the magnetically attracted position. This high current flows for a relatively short time and quickly decreases to a low value as the motor M accelerates. However, should the motor M refuse to start, or be stalled for any reason, or should a condition of overload occur during operation, the resulting high current through the heater wire 62 will quickly cause the bi-metallic strip 53 to deflect and be magnetically attracted. The overload contacts 54, 55 will therefore disengage and interrupt the flow of current to the motor M.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States, is:

1. In a circuit controller, a magnetizable frame, a magnetizable armature having one end movably mounted upon said frame and a substantially rigid free end arranged in attractive relation to said frame, means for magnetizing said frame to attract said free end thereto, and means for restraining oscillations of said armature comprising a resilient member pivoted to said frame at a point spaced from said one end slidably to engage said free end of said armature.

2. In a circuit controller, a magnetizable frame, an armature mounted for movement about a fixed point at one end and having a substantially rigid free end adjacent said frame but biased to a normal position spaced therefrom, means for magnetizing said frame to attract said free end thereto, and means for restraining oscillations of said armature comprising a resilient member pivotally mounted at a point spaced from said fixed point slidably to engage said free end of said armature.

3. In a circuit controller, a magnetizable frame, an armature having a substantially rigid movable end biased to a normal position spaced from said frame, means for magnetizing said frame to attract said armature thereto, and means for restraining oscillation of said armature comprising a resilient member pivotally mounted independently of said armature to frictionally engage said movable end of said armature.

4. In a circuit controller, a member mounted for oscillatory movement about a first fixed point, and a resilient member mounted for oscillatory movement about a second fixed point spaced from said first fixed point and frictionally engaging a substantially rigid portion of said first member at a point spaced from said first fixed point.

5. In a circuit controller, a magnetizable frame, a magnetizable armature having one end resiliently mounted upon said frame and a substantially rigid free end biased to a normal position spaced from said frame, means for magnetizing said frame to attract said free end thereto, and oscillation restraining means comprising a yoke and spring assembly pivotally mounted upon said frame at a point spaced from said one end of said armature and engaging said armature at a point intermediate its ends.

6. In a circuit controller, a magnetizable frame, a magnetizable armature movably mounted to a fixed point at one end and having a free end arranged in attractive relation to said frame, means for magnetizing said frame to attract said armature, and means for restraining oscillations of said armature comprising a yoke pivotally mounted at a point spaced from the said one end of said armature and having an arm engaging one side of said armature intermediate the ends thereof, and resilient means mounted upon said yoke and having a free end engaging the other side of said armature.

7. In a circuit controller, a magnetizable frame having a core portion and a portion forming a support spaced from said core portion, a coil mounted upon said core portion for magnetizing said frame, a cantilever spring mounted upon said support and carrying at its free end a magnetizable armature in attractive relation to said core portion, and a yoke pivotally mounted at a point spaced from said support, said yoke being provided with an arm engaging one side of said armature and with resilient means engaging the other side of said armature at a point spaced along said armature from the point of engagement of said arm.

8. In a circuit controller, a supporting member, a member mounted upon said supporting member for oscillatory movement about its point of support, and a yoke pivotally mounted at a point spaced from said point of support, said yoke being provided with an arm engaging one side of said member and with resilient means engaging the other side of said member at a point spaced from the point of engagement of said arm.

9. In a circuit controller, a magnetizable substantially U-shaped frame having one leg forming a core portion and another leg forming a supporting member, a coil mounted upon said core portion for magnetizing said frame, a cantilever spring mounted upon said supporting member and carrying at its free end a magnetizable armature arranged for lateral movement with respect to said core member, a bracket mounted upon said supporting member, a yoke having one arm pivotally mounted upon said bracket and another arm engaging one side of said armature, and a spring finger attached to said pivoted arm of said yoke, the free end of said spring finger being arranged to engage the other side of said armature at a point spaced along said armature from the point of engagement of said arm.

10. In a circuit controller, a magnetizable frame having a core portion provided with a pole face and a portion forming a supporting member spaced from said pole face, a cantilever spring mounted upon said supporting portion and carrying a magnetizable armature member having an end located in attractive relation to and biased to a normal position spaced laterally from said pole face, said pole face being so shaped as to provide a continuously decreasing air gap as said armature end approaches said face, a bracket mounted upon said supporting member, a yoke pivotally mounted upon said bracket and having an arm engaging said armature member at a point intermediate said end and said cantilever spring, and a spring finger mounted upon said yoke and having an end engaging the other side of said armature at a point spaced along said armature from the point of engagement of said arm.

11. A motor starting relay comprising a pair of normally open switch contacts arranged to be closed in response to a high surge of electric current and to be reopened upon a diminution of said current to a predetermined lower value, a magnetizable frame having a core portion, an armature for controlling said contacts, said armature having one end mounted upon said frame and a substantially rigid free end movable with respect to said core portion and arranged to be attracted to thereby, an operating coil mounted upon said core portion for magnetizing said frame, and means for restraining oscillation of said armature comprising resilient means pivotally mounted upon said frame at a point spaced from said one end of said armature slidably to engage said free end of said armature.

12. A motor starting relay comprising fixed and movable contacts arranged to be engaged upon a high surge of electric current and to be reopened upon a diminution of said current to a predetermined lower value, a flat magnetizable substantially U-shaped frame having a twisted portion forming a magnet core and a portion forming a supporting member spaced from said magnet core, a magnetizable armature mounted upon said supporting member for lateral movement with respect to said magnet core, said armature carrying said movable contact, an operating coil mounted upon said core member, a bracket mounted upon said supporting member, and means pivotally mounted upon said bracket for restraining oscillation of said armature, said means comprising a substantially U-shaped yoke having a spring finger mounted at one side thereof with its free end directed toward the other side thereof and arranged to embrace said armature between said free end of said spring finger and said other side of said U-shaped yoke.

13. In a circuit controller, a flat substantially U-shaped magnetizable frame having a twisted portion forming a magnet core and a portion forming a supporting member spaced from said magnet core, said magnet core terminating in a sloped pole face, a magnetizable armature resiliently mounted upon said supporting member for lateral movement with respect to said pole face, said armature being biased to a position spaced from said pole face, and an energizing winding mounted upon said magnet core for magnetizing said core to attract said armature, whereby the effective width of said pole face is increased with respect to the path of travel of said armature by the angular disposition of said magnet core and the air gap between said armature and said pole face continuously decreases as said armature approaches said pole face due to the angular disposition of said pole face thereby to minimize oscillation of said armature.

EDGAR H. AYERS.
WILBUR W. WARNER.